United States Patent Office 3,783,131
Patented Jan. 1, 1974

---

3,783,131
CALCIUM-CONTAINING DISPERSIONS AND PROCESS
William M. Le Suer, Cleveland, Ohio, assignor to The Lubrizol Corporation, Wickliffe, Ohio
No Drawing. Continuation-in-part of application Ser. No. 118,490, Feb. 24, 1971, which is a continuation of application Ser. No. 864,894, Oct. 8, 1969, both now abandoned, which in turn is a continuation-in-part of application Ser. No. 681,028, Nov. 6, 1967, now Patent No. 3,515,669. This application June 29, 1972, Ser. No. 267,284
Int. Cl. C10m *1/32, 3/26*
U.S. Cl. 252—34.7   14 Claims

ABSTRACT OF THE DISCLOSURE

Process for preparing calcium dispersions in essentially inert diluents by contacting a basically reacting calcium compound with an inorganic acidic material in the presence of a stabilizing agent and promoter. A typical process comprises carbonating a mixture of calcium hydroxide, lower nitroalkane, alkanol, and the reaction product of polyisobutenyl-substituted-succinic anhydride and an alkylene polyamine. The calcium-containing dispersions thus produced are useful as additives for fuels and lubricants.

---

This is a continuation-in-part of application Ser. No. 118,490 filed Feb. 24, 1971 now abandoned which, in turn, is a continuation of application Ser. No. 864,894 filed Oct. 8, 1969, now abandoned; the latter being a continuation-in-part of application Ser. No. 681,028 filed Nov. 6, 1967, now U.S. Pat. 3,515,669.

This invention relates to a novel process for solubilizing or dispersing basic metal compounds in liquid media. Particularly, the invention relates to a process for preparing stable dispersions of basic metal compounds in an organic liquid medium. The novel compositions produced by the process as well as lubricants and fuels containing these compositions also form part of the present inventive concept.

It is well-known that stable dispersions of basic metals are used extensively as detergents and corrosion inhibitors in lubricating compositions, particularly as additives for internal combustion engine lubricants. These solutions have also been found useful as petroleum-distillate fuel additives. For example, the presence of a basic metal in a diesel fuel inhibits the formation of black exhaust smoke upon combustion of the fuel in operating diesel engines. Basic metal-containing compositions and uses therefor are described, for example, in U.S. Pats. 2,616,905; 2,723,234; 2,777,874; 2,781,403; 3,031,284; 3,256,186; 3,312,618; and 3,342,733. The use of basic metal-containing compositions as smoke suppressants in diesel fuels is disclosed in German Auslegeschrift 1,243,915.

The metal-containing dispersions produced by the process of the present invention are particularly useful as additives for lubricating compositions. For example, the products function effectively as dispersants and detergents in lubricating oil compositions for internal combustion engines. However, like the above-described metal containing products of the prior art, they are also useful as anti-screenclogging agents in petroleum distillate fuels (e.g., gasoline, kerosene, fuel oils, etc.) and smoke suppressants in diesel fuels.

In accord with the foregoing, it is a principal object of this invention to provide a process for incorporating metal compounds into organic liquid media.

Another object is to provide a process for preparing stable-metal-containing dispersions particularly useful as additives for fuels and lubricants.

A further object is to provide novel metal-containing compositions.

An additional object is to provide lubricant and fuel compositions containing dispersed metal compounds therein.

These and other objects of the invention can be achieved by the process comprising the steps of contacting an inorganic acidic material with at least one basically reacting calcium compound in the presence of (a) a mixture of at least one lower nitroalkane and at least one lower monohydric alkanol, and (b) at least one stabilizing agent which is an oil-soluble acylated nitrogen-containing composition prepared by the process comprising reacting, at a temperature of from about 80° C. up to the decomposition point, a high molecular weight carboxylic acid-producing compound characterized by the presence within its structure of a high molecular weight oil-solubilizing substantially saturated group having at least about fifty aliphatic carbon atoms with from about one/half equivalent to about two moles, per equivalent of said acid producing compound, of a monoamine or polyamine wherein the ratio of equivalents of stabilizing agent to equivalents of basically reacting Group I or Group II metal compound is about 1:0.1 to about 1:30, the amount of acidic material employed is such that the ratio of equivalents of acidic material to said basically reacting calcium compound is at least 1:1, and the amount of promoter is such that the ratio of equivalents of promoter to basically reacting calcium compound is from about 0.05:1 to about 1:1. The process is normally conducted in the presence of a substantially inert, essentially nonpolar organic liquid diluent. The novel compositions produced by this process can then be incorporated in fuels and lubricants to provide the lubricant and fuel compositions contemplated by this invention.

The inorganic acidic materials used in the present process are inorganic acids or inorganic acidic gases. Suitable inorganic acids include strong or weak acids such as hydrochloric acid, sulfuric acid, nitric acid, phosphoric acid, and carbonic acid. The inorganic acidic gases would generally be anhydrides of the inorganic acids or "acid anhydride gas" such as $CO_2$. Other suitable inorganic acidic materials include HCl, $SO_2$, $SO_3$, air (due to the $CO_2$ content), $NO_2$, $H_2S$, $N_2O_2$, $PCl_3$, $ClO_2$, $H_2Fe$, $SOCl_2$, $BF_3$, $CS_2$, COS, $H_2CrO_4$, etc. For reasons of economy, effectiveness and availability, the preferred acidic materials are inorganic gases selected from the class comprising $CO_2$, $SO_2$, and $H_2S$. Gaseous carbon dioxide is the most preferred acidic material. Materials which are capable of producing the acidic reactants in situ may also be used. For example, urea, carbamates, and ammonium carbonates can be employed as acidic materials since they produce $CO_2$ in situ under the conditions of the process.

Promoters useful according to the present process are mixtures of lower monohydric alkanols and lower nitroalkanes. The lower monohydric alkanols include those having up to about seven carbon atoms such as methanol, ethanol, amyl alcohol, isopropanol, n-butanol, and the like. The lower nitroalkanes include, for example, the nitropropanes, the nitropentanes, and the nitroheptanes.

Basically reacting calcium compounds include the sulfides, hydrosulfides, amides, or alcoholates derived from alcohols having from about one to about thirty carbon atoms. However, the preferred calcium compounds are the oxides, hydroxides, and lower alkoxides, the latter being derived from lower alkanols containing up to about seven carbon atoms. Specific basically reacting metal compounds include calcium oxide, calcium hydroxide, calcium ethoxide, and the like.

The acids from which the stabilizing agents are derived correspond to the general formula (R)—(COOH)$_n$ where $n$ is a positive whole number having a value of one to six, preferably 1 or 2, and R is a mono- to hexavalent (depending on the value of *n*) substantially saturated aliphatic hydrocarbon radical having at least about fifty aliphatic carbon atoms. The variable R may contain pendant aryl groups or substantially inert polar groups. However, the polar groups should not be present in sufficiently large numbers to alter the substantially hydrocarbon character of the substituent. Exemplary polar groups include halo, carbonyl, oxy(—O—), formyl, nitro, thio(—S—) etc. The upper limit on the number of polar groups is about 10% by weight based on the total weight of the hydrocarbon portion of the substituent. The hydrocarbon substituent should contain no more than about 5% olefinic linkages based on the total number of carbon-to-carbon covalent linkages present in the substituent. Preferably, the number of olefinic linkages will not exceed about 2% of the total covalent linkages.

The source of the hydrocarbon substitutent, R, on the acid includes principally the high molecular weight substantially saturated petroleum fractions and substantially saturated olefin polymers, particularly polymers of monoolefins having from two to thirty carbon atoms. The especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. They are illustrated by 2-butene, 3-butene, and 4-octene. The preferred substituent is derived from polymerized isobutylene or propene.

Also useful are the interpolymers of the foregoing olefins with each other and/or with other interpolymerizable olefinic substances such as aromatic olefins, cyclic olefins, polyolefins. Such interpolymers include, for example, those prepared by polymerizing isobutene with styrene; isobutene with butadiene; propene with isoprepene; ethylene with piperylene; isobutene with chloroprene; isobutene with p-methylstyrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil-solubility of the final products derived from such interpolymers. Thus, for reasons of oil-solubility and stability the interpolymers contemplated for use in this invention should be substantially aliphatic and substantially saturated, i.e., they should contain at least about 80%, preferably at least about 95%, on a weight basis, of units derived from aliphatic mono-olefins.

Specific examples of such interpolymers include the copolymer of 95% of isobutene and 5% of styrene; the terpolymer of 98% of isobutene with 1% of piperylene and 1% of chloroprene; the terpolymer of 95% of isobutene with 2% of 1-butene and 3% of 1-hexene; the terpolymer of 80% of isobutene with 10% of 1-pentene and 10% of 1-octene; the copolymer of 80% of 1-hexene and 20% of 1-heptene; the terpolymer of 90% of isobutene with 2% of cyclohexene and 8% of propene; and the copolymer of 80% of ethylene and 20% of propene. The percentages refer to the percent by weight of total interpolymer weight.

Another source of hydrocarbon substituents are saturated aliphatic hydrocarbons, e.g., highly refined high molecular weight white oils or synthetic alkanes such as are obtained by hydrogenation of the high molecular weight olefin polymers illustrated above or other high molecular weight olefinic substances.

Olefin polymers having molecular weights from about 700 to about 10,000 are the preferred source of the substituent with those having molecular weights of about 700 to 5000 being especially preferred.

The stabilizing agents are the esters, amides, imides and amidines derived from the above-described carboxylic acids and the appropriate hydroxy compound or amine, respectively. As mentioned before, acid-producing equivalents such as anhydrides, halides, lower alkyl esters, and the like can be used in lieu of the acid per se in preparing these stabilizing agents. The indicated derivatives of mono- and dicarboxylic acids are preferred. The acid and acid-producing compounds necessary for preparing the stabilizing agents are known in the prior art. The stabilizing agents themselves are also known or can be prepared through conventional processes.

Substituted succinic acid derivatives constitute the most preferred class of stabilizing agents. Substituted succinic acid producing compounds are readily prepared by reacting maleic anhydride with a suitable olefin polymer or chlorinated hydrocarbon of the types described hereinabove. The reaction involves merely heating the two reactants at a temperature of about 100° to 200° C. The product of such a reaction is a succinic anhydride having a large hydrocarbon substituent. The hydrocarbon substituent may contain olefinic linkages. These may be converted, if desired, to saturated paraffinic linkages by hydrogenation. The anhydride may be hydrolyzed by treatment with water or steam to the corresponding acid and the acid converted to the corresponding halide. It will be noted in this regard that the anhydride is equivalent to the acids and the acid halides insofar as their utility in the preparation of the dispersants of this invention. In fact, the anhydride is often more reactive than the acid and is often preferred.

In lieu of the olefins or chlorinated hydrocarbons, other hydrocarbons containing an activating polar substituent, i.e., a substituent which is capable of activating the hydrocarbon molecule in respect to reaction with maleic acid or maleic anhydride, may be used in the above-illustrated reaction for preparing the substituted succinic acids. Such polar substituents are exemplified by sulfide, disulfide, nitro, mercaptan, halo, carbonyl, or formyl radicals. Examples of such polar-substituted hydrocarbons include polypropene sulfide, di-polyisobutene disulfide, nitrated mineral oil, di-polyethylene sulfide, brominated polyethylene, etc. Another useful method for preparing succinic acids and anhydrides involves the reaction of itaconic acid with a high molecular weight olefin or a polar-substituted hydrocarbon at a temperature usually within the range of from about 100°–200° C.

The stabilizing agents prepared from the reaction of polyolefin-substituted succinic acid or anhydride and mono- or polyamines, particularly polyalkylene polyamines having up to about 10 amino nitrogens, are especially suitable. The reaction products generally comprise a mixture of amides, imides, and/or amidines. The reaction products of polyisobutene-substituted succinic anhydride and polyethylene polyamines containing up to about ten amino nitrogens are excellent stabilizing agents. These anhydride-amine products are disclosed in 3,018,250; 3,024,195; 3,172,892; 3,216,936; 3,219,666; and 3,272,746. Included within this group of dispersants are those products prepared by post-treating the reaction product of the amine and substituted succinic anhydride with carbon disulfide, a boron compound, an alkyl nitrile, urea, thiourea, guanidine, alkylene oxide, and the like as disclosed in 3,200,107; 3,256,185; 3,087,936; 3,254,025; 3,281,428; 3,278,550; 3,312,619 and British specification 1,053,577. Half-amide, half-metal salt and half-ester, half-metal salt derivatives of hydrocarbon substituted succinic acids are also useful stabilizing agents. The products are disclosed in 3,163,603 and applicant's copending application Ser. No. 567,052.

Suitable monocarboxylic acid acylating agents and/or amine derivatives thereof and methods for their preparation are disclosed in detail in U.S. Pats. 3,272,746; 3,340,281; 3,341,542; and 3,342,733.

The foregoing patents are incorporated herein by reference for their disclosure of (1) the requisite acids or acid producing compounds such as acid halides, acid anhydrides, and the like useful in producing the stabilizing agents, (2) processes for preparing amides, imides, and amidines from these acid producing compounds, and (3) actual examples of suitable amides, etc., which can be satisfactorily employed as stabilizing agents in the present invention.

A convenient method for preparing the acylated nitrogen stabilizing agents from $R\text{-}(COOH)_n$ comprises reacting the acid or an acid-producing compound characterized by at least one

group wherein X is selected from the class consisting of halogen, hydroxy, hydrocarbonoxy, and acyloxy radicals, with at least about one-half an equivalent of a nitrogen-containing compound characterized by the presence within its structure of at least one group of the formula

The above process is generally carried out by heating a mixture of the acid-producing and nitrogen-containing reactants at a temperature above about 80° C., preferably within the range of about 100° C. to about 250° C. The use of a solvent such as benzene, toluene, naphtha, mineral oil, xylene, n-hexane, or the like is often desirable in the above process to facilitate the control of the reaction temperature.

The relative ratio of the acid-producing compounds to the nitrogen-containing reactants in the above process are such that at least about one-half of a stoichiometrically equivalent amount of a nitrogen-containing reactant is used for each equivalent of the acid-producing compound. It should be noted that the equivalent weight of the nitrogen-containing reactant is based upon the number of the nitrogen-containing radicals,

Similarly, the equivalent weight of the acid-producing compound is based upon a number of acid radicals of the formula

where X is as previously defined. Thus, ethylenediamine has two equivalents per mole; amino guanidine has four equivalents per mole; and a succinic acid or ester has two equivalents per mole.

The upper limit of the useful amount of the nitrogen-containing reactant appears to be about two moles for each equivalent of the acid-producing compound. Such amount is required, for instance, in the formation of products having predominantly amidine linkages. Beyond this limit, the excess amount of a nitrogen-containing reactant appears not to take part in the reaction and thus simply remains in the product apparently without any adverse effect. On the other hand, the lower limit of about one-half equivalent of a nitrogen-containing reactant used for each equivalent of the acid producing compound is based upon the stoichiometry for the formation of products having predominantly imide linkages. In most instances, the preferred amount of the nitrogen-containing reactant is approximately one equivalent for each equivalent of the acid-producing reactant.

The process of the present invention is normally conducted in the presence of a substantially inert, essentially nonpolar organic liquid diluent. Since the resulting products are particularly useful as additives for lubricating oil and fuel compositions, the diluent normally will be a liquid which is soluble in lubricating oils and fuels. For this reason, the diluent usually comprises a lubricating oil such as a synthetic lubricating oil or a mineral lubricating oil. However, other organic diluents can also be employed, either alone or in combination with each other or in combination with lubricating oil diluents. Suitable solvents include dialkyl ketones, alkyl aryl ketones, (e.g., dipropyl ketone, methyl butyl ketone, acetophenone) and ethers such as n-propylether, n-amylether, and isoamylether.

Particularly useful diluents include the aliphatic and aromatic hydrocarbons and halohydrocarbons such as benzene, toluene, xylene, chlorobenzene; lower boiling petroleum distillates such as kerosene and the various naphthas, the normally liquid aliphatic hydrocarbons and halohydrocarbons such as hexane, heptane, hexene, chlorohexane, cyclopentane, cyclohexane, ethyl cyclohexane, and the like. These diluents which serve as the reaction medium are used alone or in combination with mineral oil or other natural or synthetic oils. When a combination of oil in one or more of the other solvents is used, the weight ratio of oil to the other solvent is generally 1:20 to 20:1. It is usually desirable for the lubricating oil to comprise at least about 50% by weight of the weight of diluent, especially if the product is to be used as a lubricant additive.

Upon completion of the present process, solids are removed from the reaction mass by filtration or other conventional means, and the resulting reaction product, including the inert diluent, can be added directly to the lubricating oil or fuel composition in which it is to be employed. Optionally, readily removable diluents can be removed by conventional techniques such as distillation prior to incorporating the reaction mixture into the lubricant or fuel composition. As is apparent to those skilled in the art, the amount of diluent employed can be increased or decreased during formation of the dispersions or before adding to the fuel or lubricant to facilitate mixing, temperature control, or to meet some other particular requirement related to the ultimate use of the composition.

It is obvious that it may be desirable to use reflux conditions to retain diluent and/or promoter having a boiling point that is lower than that of the reaction temperature. The need for such conditions depends on the particular promoters and diluents, the amount of each present, the reaction temperature, the duration of the reaction, and the amount of metal to be dispersed in the reaction product.

The invention encompasses bringing the various reactants together in any order. However, the procedure found to produce the best overall results comprises forming an initial reaction mixture made up of at least one each of a basically reacting calcium compound, promoter, stabilizing agent, and the diluent. The acidic material is then introduced into this initial mixture. During the course of the reaction, the acidic material and the basically reacting calcium compound react to form a metal-containing reaction product which is dispersed in the reaction medium. The stabilizing agent prevents the metal-containing reaction product from precipitating, i.e., it "stabilizes" the dispersion.

This basic preferred order of reaction can be varied to produce the best results with given reactants under given conditions. Thus, the basically reacting calcium compound can be added in increments during the introduction of the acidic material. Moreover, additional stabilizing agent and/or diluent can be added during or after the process. The determination of an optimum order of reaction for given conditions is a matter of routine experimentation.

The basically reacting calcium compound and the stabilizing agent normally are employed in amounts such that the ratio of equivalents of stabilizing agent to equivalents of calcium is about 1:0.1 to about 1:30 and preferably 1:0.5 to about 1:12. For purposes of determining this ratio, the number of equivalents in a stabilizing agent is the number of carboxylic acid functions present. For example, a polyisobutenyl substituted succinic methyl ester contains two carboxylic functions. Thus, it has two equivalents per molecule. The number of carboxyl functions present in the stabilizing agent is readily apparent from the amount of acid producing compound used in preparing the stabilizing agent. The number of equivalents in the basically reacting calcium is two equivalents per mole of metal.

The amount of acidic material employed depends upon the amount of metal to be dispersed in the reaction mixture. Theoretically, the ratio of equivalents of acidic material to equivalents of calcium to be dispersed is 1:1. However, as a practical matter, utilization of the acidic material is not very efficient where inorganic acidic gases are used. Accordingly, the ratio of equivalents of acidic material to equivalents of calcium to be dispersed ranges from the stoichiometric ratio of about 1:1 to a large excess, for example, about 1:10.

From the foregoing, it is apparent that the entire amount of basically reacting calcium compound employed in the reaction mixture is not necessarily reacted with the acidic material and thereby dispersed. All that is required is that some acidic material be reacted with at least a portion of the basically reacting calcium compound so that some metal compound is dispersed in the reaction mixture. Unreacted non-dispersed basically reacting calcium compound is normally removed from the reaction mixture upon completion by filtration or other convenient means.

The promoter mixture will be present in the reaction mass in an amount such that the ratio of the number of equivalents of promoter to basically reacting calcium compound is about 0.05:1 to about 1:1 and preferably 0.1:1 to 0.5:1. The lower monohydric alkanols have one equivalent per mole. Likewise, the number of equivalents per mole of a nitroalkane corresponds to the number of nitro groups per mole.

As stated before, an organic diluent is normally employed in a process. Since the diluent is inactive, the amount present is not particularly critical. However, the diluent will ordinarily comprise from about 10% to about 90%, and preferably 30% to 70%, by weight of the reaction mixture based on the total weight of material in the reaction mixture exclusive of the acidic material.

The temperature at which the acidic material is contacted with the initial reaction mixture can vary from about 75° to about 300° C. The optimum temperature depends in a large measure upon the promoters employed. With phenolic promoters, the temperature usually ranges from about 80° C. to about 300° C. and preferably from about 100° C. to about 250° C. When an alcohol is employed as a promoter, the temperature usually will not exceed the reflux temperature of the reaction mixture and preferably will not exceed about 100° C. Temperatures of about 100° C. to about 125° C. are very useful when the promoter is a nitroalkane. The optimum temperature for a mixture of promoters is readily ascertained using the suggested temperature ranges as guides.

The following examples demonstrate the preparation of typical stabilizing agents. It is to be understood that these examples are merely illustrative. In lieu of the products produced in Examples 1–3, other stabilizing agents disclosed in the hereinbefore discussed prior art can be utilized. Unless otherwise indicated, all percentages and parts express percent by weight and parts by weight.

EXAMPLE 1

(A) A reaction mixture comprising 196 parts by weight of mineral oil, 280 parts by weight of a polyisobutenyl (M.W. 1000)-substituted succinic anhydride (0.5 equivalent) and 15.4 parts of a commercial mixture of ethylene polyamine having an average composition corresponding to that of tetraethylene pentamine (0.375 equivalent) is mixed over a period of approximately fifteen minutes. The reaction mass is then heated to 150° C. over a five-hour period and subsequently blown with nitrogen at a rate of five parts per hour for five hours while maintaining a temperature of 150–155° C. to remove water. The material is then filtered producing 477 parts of product in oil solution.

(B) The procedure of Example 1(A) is repeated but the amount of amine is increased so that the ratio of equivalents of polyisobutenyl substituted succinic anhydried to ethylene polyamine mixture is 1:1.

(C) The procedure of Example 1(A) is repeated with the amount of amine being increased so that the ratio of equivalents of anhydride to amine is 1:1.5.

(D) The procedure of Example 1(A) is repeated except that the ratio of equivalents of anhydride to amine is 1:2.

EXAMPLE 2

A mixture of 1.0 equivalent of a mono-carboxylic acid (prepared by chlorinating a polyisobutene having a molecular weight of 750 to a product having a chlorine content of 3.6% by weight, converting the product to the corresponding nitrile by reaction with the equivalent amount of potassium cyanide in the presence of a catalytic amount of cuprous cyanide and hydrolyzing the resulting nitrile by treatment with a 50% excess of a dilute aqueous sulfuric acid at the reflux temperature) and 0.5 eqivalent of ethylene diamine is mixed with twice its volume of xylene. The resulting mixture is heated at the reflux temperature until no more water is removed by distillation. The mixture is heated further and the xylene is removed by distillation under reduced pressure. The residue is the desired acylated nitrogen compound.

EXAMPLE 3

A methyl ester of a high molecular weight monocarboxylic acid is prepared by heating an equimolar mixture of a chlorinated polyisobutene having a molecular weight of 1,000 and a chlorine content of 4.7% and methylmethacrylate at 140°–220° C. The resulting ester is then heated with a stoichiometrically equivalent amount of triethylene tetramine at 100°–200° C. to produce an acylated nitrogen compound useful as stabilizing agent in the process of the present invention.

The following examples demonstrate the process of the invention. The resulting products are the desired calcium-containing compositions discussed hereinbefore.

EXAMPLE I

A mixture of 588 grams of the filtrate prepared according to Example 1(C), adjusted to an oil content of 40%, 971 grams of diluent oil, 85 grams of 1-nitro-propane, 56 grams of isobutanol, 29 grams of amyl alcohol, 89 grams calcium hydroxide, and 10 grams of a 50% aqueous calcium chloride solution are refluxed at 100° C. for two hours. The calcium chloride serves as an auxiliary promoter and improves the efficiency of the process. Other ammonium, alkali, or alkaline earth metal halides, particularly ammonium chloride, sodium chloride, and barium chloride, can also be used in lieu of all or a portion of the calcium chloride. Bromides and iodides can also be used. This mixture is carbonated (2 cubic feet per hour) at 100°–105° C. for 1.5 hours. The carbonated mixture is then dried at 150° C. with nitrogen blowing and filtered. The filtrate is characterized as follows: oil—71.8%; N—0.84%; calcium sulfate ash content—9.1%.

EXAMPLE II (A) A reaction mixture containing 1008 grams of a filtrate prepared according to Example 1(A), adjusted to a 40% oil content, 812 grams mineral oil, 115 grams of 1-nitropropane, 75 grams of isobutanol, 40 grams of amyl alcohol, 10 grams of a 50% aqueous solution of calcium chloride, and 119 grams of calcium hydroxide is heated under reflux conditions for five hours at 100° C. and then carbonated at the rate of 2 cubic feet per hour for two hours during which time the reaction mixture temperature rises to 130° C. The mixture is stripped at 150° C. during which time carbonation is continued and subsequently filtered. The filtrate is characterized as follows: weight—1741 grams; oil content—61.6%; nitrogen content—0.78%; calcium sulfate ash content—9.9%.

(B) The procedure of Example II(A) is repeated but 1012 grams of oil are used and 115 grams of 2-nitropropane are substituted for the 1-nitropropane of (A). The filtrate has a calcium sulfate ash content of 10%.

The foregoing examples are merely illustrative. Obviously, many modifications can be made in accord with the general description of the invention presented hereinabove. For example, other acidic materials, stabilizing agents, promoters, and/or basically reacting calcium compounds can be substituted for those of the particular illustrative examples with good results. Such modifications are clearly within the skill of the art in view of the present specification and require no further discussion herein. All that is required to achieve these substitutions is to replace all or a portion of the reactants in the examples with an equivalent amount of the reactant to be substituted.

Certain general conclusions have been drawn as a result of conducting the above and similar reactions. These conclusions should serve as useful guide lines to those desiring to practice the invention. First, water is advantageously removed as soon as formed as the reaction mixture is being contacted with the acidic material (e.g., during carbonation) for best results. Furthermore, a mixture of at least one monohydric lower alkanol (e.g., methanol, propanol, butanol, etc.) and 1-nitropropane is generally more effective in dispersing calcium metal than either the alkanols or 1-nitropropane alone. Moreover, with basically reacting calcium compounds, 1-nitropropane is more effective than 2-nitropropane. Generally, calcium chloride is an effective co-promoter when preparing calcium dispersions.

The determination of the optimum molar ratios for any combination of lower nitroalkanes and monohydric lower alkanols is within the skill of the art and can be determined by routine experimentation using the ratios of the illustrative examples as starting points. Usually the molar ratios of lower nitroalkane to monohydric lower alkanol will be in the range of about 1:5 to about 5:1 with a range of about 1:2 to about 2:1 being preferred. Molar ratios of about 1:1 have been found to be especially useful. Since the use of calcium chloride as a copromoter is optional, the amount in which it is employed is not critical although there is usually no advantage in using more than about 0.25 mole of calcium chloride per mole of the total number of moles of lower nitroalkane and monohydric lower alkanol. In fact, very small amounts of the calcium chloride promoter are effective and usually not more than about 0.01 to about 0.1 mole of calcium chloride is used per mole of the total number of moles of lower nitroalkanes and monohydric alkanols.

Obviously, the stabilizing agents of the present invention can be used alone or in combination with each other in preparing the calcium-containing dispersions. However, these stabilizing agents can be used in conjunction with other known stabilizing agents or peptizing agents as they are denominated in the prior art. These peptizing agents are quite diverse and include the oil-soluble organic acids and the Group I and Group II metal salts thereof such as the petrosulfonic acids, barium petrosulfonate, oleic acid, calcium oleate, the phosphorus acid mixture produced by steam blowing the reaction product of polyisobutylene and $P_2S_5$, and the like. Other peptizing agents are aliphatic amines such as N-octadecyl propylene diamine and the condensation product of such amines with lower aldehydes such as formaldehyde. These and other peptizing agents are well-known in the art and require no further discussion herein.

The calcium-containing dispersions of the present invention can be incorporated directly into various lubricating and fuel compositions. The amount to be used depends upon whether the additive is added to a lubricant, a fuel, and the environment under which the lubricant or fuel is to be employed. For example, these calcium-containing dispersions can be successfully employed as detergent dispersant additives for crankcase lubricating oils when employed in an amount sufficient to impart a sulfate ash content to the lubricating oil of 0.01% to 20%, preferably 0.01% to 10% by weight. If the lubricating oil is to be used as a crankcase lubricant for gasoline engines, it normally will contain up to about 1% ash. On the other hand for diesel engines, sufficient additive should be used to provide the lubricant with an ash content of up to about 2%–5% ash while marine diesels may require enough additive to provide an ash content of 10% or more.

When the calcium-containing dispersions are added to fuels as anti-screenclogginng agents, they will normally be employed in amounts such that the ash content of the fuel will be from about 0.001% to about 0.05%. If, however, the additive is used in a diesel fuel to suppress the formation of black exhaust smoke upon combustion of the fuel in a diesel engine, enough additive should be employed to impart a sulfate ash content to the diesel fuel of about 0.01% to about 1% preferably 0.01% to 0.5%. The alkaline earth metal dispersions are preferred when it is desired to impart smoke suppression qualities to diesel fuels. Barium dispersions are particularly effective.

The calcium-containing dispersions of the present invention can be used along or in combination with other fuel and lubricating additives known in the prior art. These additives include for example, other detergents of the ash-containing type, ashless dispersants, viscosity index improving agents, pour point depressing agents, anti foam agents, extreme pressure agents, rust inhibiting agents, and oxidation and corrosion inhibitors.

The ash-containing detergents are the well known neutral and basic alkali or alkaline earth metal salts of sulfonic acids, carboxylic acids, or organic phosphorus containing acids. These latter are characterized by at least one direct carbon-to-phosphorus linkage. Such acids can be prepared by the steam-treating an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are the sodium, potassium, lithium, calcium, magnesium, strontium, and barium salts. The calcium and barium salts are used more extensively than the others. The "basic salts" are those metal salts known in the art wherein the metal is present in a stoichiometrically larger amount than that necessary to neutralize the acid. The calcium and the barium overbased petrosulfonic acids are typical examples of such basis salts.

The ashless dispersants are also a well known class of materials used as additives for lubricating oils and fuels. They are particularly effective as dispersants at lower temperatures. The stabilizing agents of the present invention are representative of these dispersants.

Extreme pressure agents, corrosion inhibiting agents, and oxidation-inhibiting agents are exemplified by chlorinated aliphatic hydrocarbons such as chlorinated was; organic sulfides and polysulfides such as benzyldisulfide, bis-chlorobenzyl)disulfide, dibutyltetrasulfide, sulfurized sperm oil, sulfurized methyl ester of oleic acid, sulfurized alkylphenol, sulfurized dipentene, and sulfurized terpene, sulfurized Diels-Alder adducts such as sulfurized adduct of butadiene and butylacrylate; phosphosulfurized hydrocarbons such as the reaction product of a phosphorus sulfide with terpentine or methyl oleate; phosphorus esters such as the dihydrocarbon and trihydrocarbon phosphites, e.g., dibutylphosphite, diheptylphosphite, dicyclohexylphosphite, pentylphenylphosphite, dipentylphenylphosphite, tridecylphosphite, distearylphosphite, and polypropylene(molecular weight 500)-substituted phenylphosphite; metal thiocarbonates exemplified by zinc dioctyldithiocarbonate and barium heptylphenyldithiocarbonate; Group II metal salts of phosphorodithioic acids such as zinc dicyclohexylphosphorodithioate, zinc dioctylphosphorodithioate, barium di(heptylphenyl) phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

These additional additives are well known to those skilled in the art and the foregoing listing is merely to illustrate the types of additional additives which can be present in the lubricating and fuel compositions in which the metal-containing dispersions of the present invention are employed. A brief survey of additives for lubricating compositions is contained in Lubricant Additives, C. V. Smalheer and R. Kennedy Smith, published by The Lezius-Hiles Company, Cleveland, Ohio, 1967.

When additional additives are present, they will normally be employed in amounts such that they comprise from about 0.001% to about 20% by weight of the total composition. For example additional ashless dispersants can be employed in amounts of from about 0.1% to about 10% while additional metal-containing detergents will be present in amounts of from about 0.1% to about 20% by weight. Since the present metal-containing dispersions contain both a dispersant and metal compound, it will be obvious to those skilled in the art that the present compositions can be substituted in known lubricating compositions in such a manner that the metal-containing dispersions replaces all or a portion of the metal and the stabilizing agents replaces all or a portion of the ashless dispersants in the known compositions. Pour point depressants, extreme pressure additives, viscosity index improving agents, and anti-foaming agents, and the like are normally employed in amounts up to about 0.001% to about 10% by weight of the total composition depending on the nature and purpose of the particular additive.

The following compositions exemplify typical useful embodiments of the calcium-containing dispersions of the present invention.

Composition A

SAE 10W-30 mineral lubricating oil containing 2% of the product of Example I, 0.075% of phosphorus as the adduct of zinc di-cyclohexylphosphorodithioate treated with 0.3 mole of ethylene oxide, 2% of sulfurized sperm oil having a sulfur content of 10%, 3.5% of a poly-(alkylmethacrylate) viscosity index improver, 0.02% of a poly-(alkylmethacrylate) pour point depressant, 0.003% of a poly-(alkylsiloxane) anti-foam agent.

Composition B

SAE 20 mineral lubricating oil containing 1% of the product of Example II(A).

Composition C

SAE 20 mineral lubricating oil containing 2% of the product of Example II(B), and 0.07% of phosphorus as zinc di-n-octylphosphorodithioate.

Composition D

Diesel fuel containing 0.15% calcium sulfate ash from the product of Example I.

Composition E

Kerosene containing 0.01% sulfate ash of the product of Example II(A).

While the foregoing generally refers to the use of the calcium-containing dispersions in mineral lubricating oils of petroleum distillate fuels, it should be understood that the present invention is not limited to use in mineral oil-based lubricating compositions. Other lubricating oils, natural as well as synthetic can be used as the base of the lubricating oil and grease compositions contemplated by the present invention. Such natural and synthetic bases include hydrocarbon oils produced from alkylene oxides such as polyethylene oxide and polypropylene oxide polymers or the esters and ethers thereof. The synthetic ester oils such as those produced from polycarboxylic acids and alcohols including glycols and polyglycols are also contemplated as being within the scope of the invention. Examples of these oils are dibutyl adipate, di-(2-ethylhexyl) sebacate, dilauryl azelate, etc.

What is claimed is:

1. A process for the preparation of a calcium-containing dispersion in an essentially inert diluent which comprises the step of contacting, at a temperature of from about 75° C. to about 300° C., an inorganic acidic material selected from the group consisting of carbon dioxide, sulfur dioxide, and hydrogen sulfide with at least one basically reacting calcium compound in the presence of
   (A) a promoter which is a mixture of at least one lower nitroalkane and at least one lower monohydric alkanol;
   (B) at least one stabilizing agent, which is an oil-soluble acylated nitrogen-containing composition prepared by a process comprising the acylation of a hydrocarbyl amino compound selected from the group consisting of monoamines and polyamines, with at least one high-molecular weight substantially saturated hydrocarbon-substituted carboxylic acid acylating agent, having at least fifty carbon atoms, wherein the ratio of amino compound to the acylating agent is in the range of from about 0.5 equivalent to about two moles per equivalent of acylating agent; and
   (C) the inert diluent;
wherein the ratio of equivalents of the stabilizing agent to the calcium compound is in the range of from about 1:0.1 to about 1:30, the amount of acidic material employed is such that the ratio of equivalents of the acidic material to the calcium compound is at least 1:1, the amount of promoter to the calcium compound is in the range of from about 0.05:1 to about 1:1, and the molar ratio of the nitroalkane to the lower alkanol is in the range of from about 1:5 to about 5:1.

2. The process of claim 1, wherein the nitroalkane is a nitropropane, and the calcium compound is a member selected from the group consisting of oxides, hydroxides, and lower alkoxides.

3. The process of claim 1, wherein the acylating agent is a substituted succinic acid acylating agent, and the amino compound is an alkylene polyamine having up to about ten amino nitrogens.

4. The process of claim 2, wherein the ratio of equivalents of the stabilizing agent to equivalents of the calcium compound is in the range of from about 1:0.5 to about 1:12, the ratio of equivalents of the acidic material to the equivalents of the calcium compound is in the range of from about 1:1 to about 1:10, and the ratio of equivalents of promoters to the calcium compound is from about 0.1:1 to about 0.5:1.

5. The process of claim 4, wherein the acidic material is carbon dioxide.

6. The process of claim 5, wherein the calcium compound is calcium hydroxide, the nitroalkane is 1-nitropropane, the acylating agent is a substituted succinic acid, and the amino compound is an alkylene polyamine having up to ten amino nitrogens.

7. The process of claim 6, wherein calcium chloride is present in an amount of up to 0.25 moles of calcium chloride per mole of the total number of moles of lower nitroalkane and monohydric lower alkanol during carbonation.

8. A process for the preparation of a calcium-containing dispersion in an essentially inert diluent which comprises the step of contacting, at a temperature of from about 75° C. to about 300° C., carbon dioxide with at least one basically reacting calcium compound selected from the group consisting of oxides, hydroxides, and lower alkoxides, in the presence of
   (A) a promoter, which is a mixture of a nitropropane and at least one lower monohydric alkanol;
   (B) at least one stabilizing agent, which is an oil-soluble acylated nitrogen-containing composition prepared by a process comprising the acylation of an ethylene polyamine having up to about ten amino nitrogens with a substantially saturated hydrocarbon substituted succinic acid acylating agent, having at least fifty carbon atoms, wherein the ratio of amino compound to acylating agent is in the range of from about 0.5 equivalent to about two moles per equivalent of acylating agent; and (C) the inert diluent;

wherein the ratio of equivalents of stabilizing agent to equivalents of calcium compound is in the range of from about 1:0.5 to about 1:12, the ratio of equivalents of carbon dioxide to calcium compound is in the range of from about 1:1 to about 1:10, the ratio of equivalents of promoter to calcium compound is in the range of from about 0.1:1 to about 0.5:1, and the molar ratio of the nitroalkane to the lower alkanol is in the range of from about 1:2 to about 2:1.

9. A calcium-containing dispersion produced according to the process of claim 1.

10. A calcium-containing dispersion produced according to the process of claim 6.

11. A calcium-containing dispersion produced according to the process of claim 8.

12. A lubricant or fuel composition comprising a major amount of lubricating oil or petroleum distillate fuel and an amount of the calcium-containing dispersion prepared according to the process of claim 1, to impart a sulfate ash content to the lubricant of from about 0.01% to about 20% by weight, and a sulfate ash content to the fuel of from about 0.001% to about 1%.

13. A lubricant or fuel composition comprising a major amount of lubricating oil or petroleum distillate fuel and an amount of the calcium-containing dispersion prepared according to the process of claim 6, to impart a sulfate ash content to the lubricant of from about 0.01% to about 20% by weight, and a sulfate ash content to the fuel of from about 0.001% to about 1%.

14. A lubricant or fuel composition comprising a major amount of lubricating oil or petroleum distillate fuel and an amount of the calcium-containing dispersion prepared according to the process of claim 8, to impart a sulfate ash content to the lubricant of from about 0.01% to about 20% by weight, and a sulfate ash content to the fuel of from about 0.001% to about 1%.

References Cited
UNITED STATES PATENTS

| | | | |
|---|---|---|---|
| 2,695,910 | 11/1954 | Asseff et al. | 44—68 X |
| 2,777,874 | 1/1957 | Asseff et al. | 260—504 |
| 3,256,186 | 6/1966 | Greenwald | 252—18 X |
| 3,410,671 | 11/1968 | Le Suer | 44—51 |
| 3,451,931 | 6/1969 | Kahn et al. | 44—51 X |

PATRICK P. GARVIN, Primary Examiner

A. H. METZ, Assistant Examiner

U.S. Cl. X.R.

44—51, 63; 252—18, 25, 33.6, 40.7, 51.5 A